C. A. SHELDON.
AUTOMOBILE FENDER.
APPLICATION FILED SEPT. 3, 1914.
1,129,239.
Patented Feb. 23, 1915.
2 SHEETS—SHEET 1.
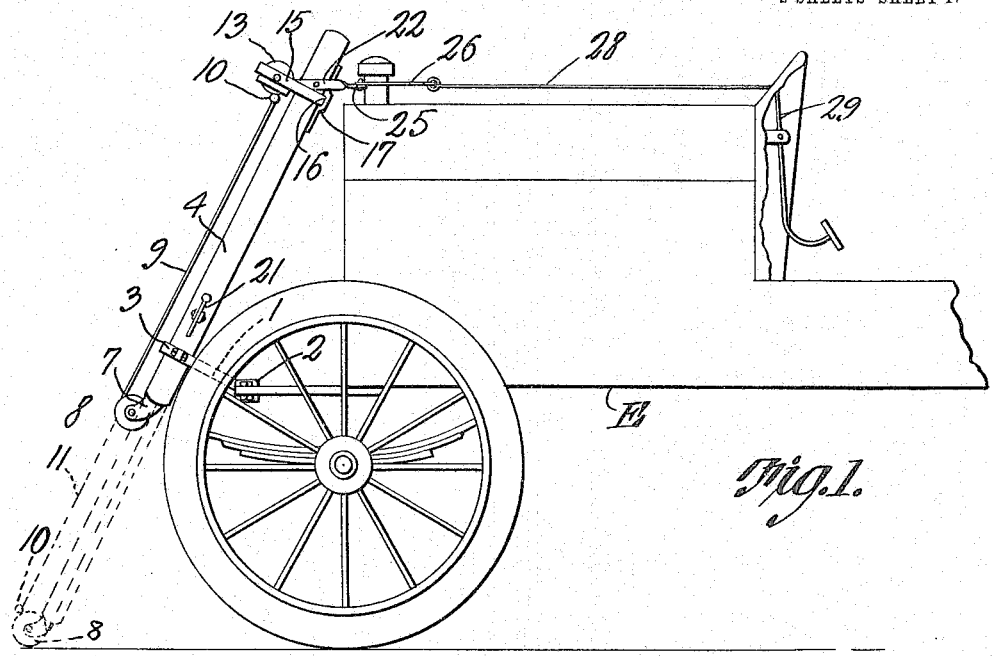
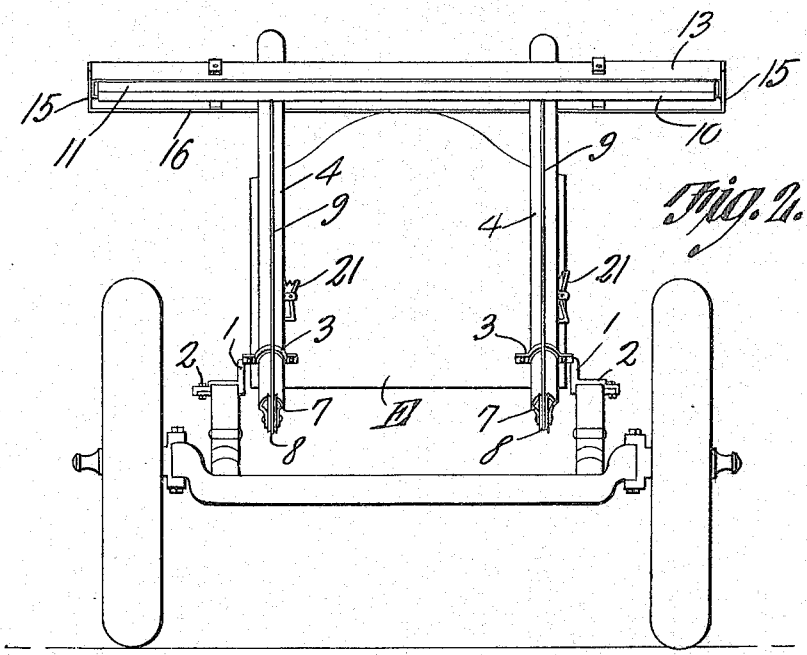
Witnesses
Inventor
C. A. Sheldon
by
Attorneys

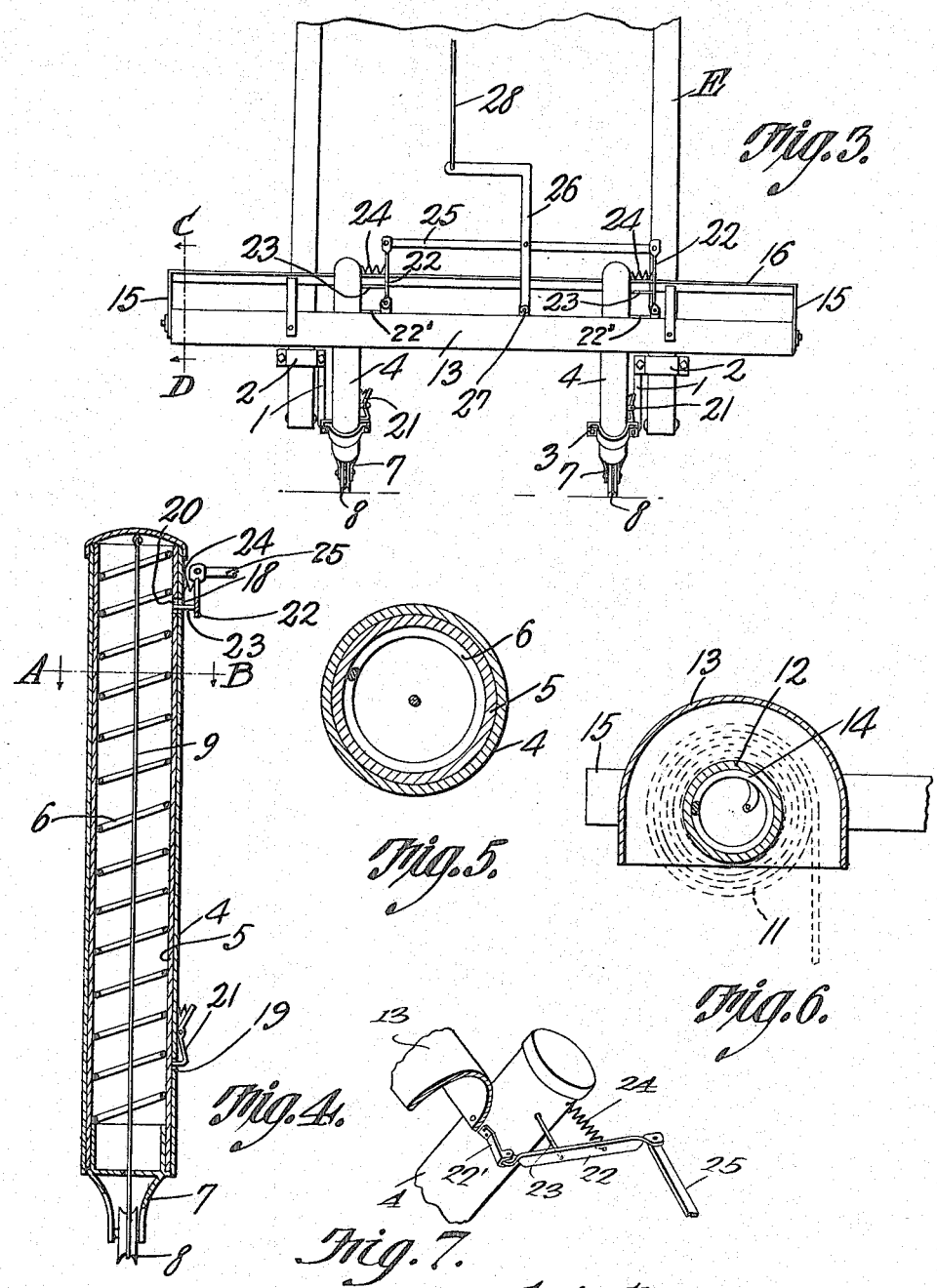

UNITED STATES PATENT OFFICE.

CHARLES ARTHUR SHELDON, OF HUDSON, NEW YORK.

AUTOMOBILE-FENDER.

1,129,239.   Specification of Letters Patent.   Patented Feb. 23, 1915.

Application filed September 3, 1914. Serial No. 860,086.

*To all whom it may concern:*

Be it known that I, CHARLES A. SHELDON, a citizen of the United States, residing at Hudson, in the county of Columbia and State of New York, have invented a new and useful Automobile-Fender, of which the following is a specification.

This invention relates to fenders designed for use in connection with motor vehicles, one of its objects being to provide a device of this character which is simple and compact in construction, can be mounted readily upon a motor vehicle, and which, when released from normal or set position, will be projected automatically downwardly into contact with the ground so as thus to prevent any object from passing under the wheels of the vehicle.

A further object is to provide a device of this character which is compact in construction and will not readily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown.

In said drawings:—Figure 1 is a side elevation of a portion of a motor vehicle having the present improvement combined therewith, the position of the fender when released, being indicated by dotted lines. Fig. 2 is a front elevation of the structure shown in Fig. 1. Fig. 3 is a top plan view of the fender and its releasing mechanism. Fig. 4 is an enlarged vertical longitudinal section through one of the side members of the fender. Fig. 5 is an enlarged section on the line A—B, Fig. 4. Fig. 6 is an enlarged section on the line C—D, Fig. 3. Fig. 7 is a detail view showing one of the latches and adjacent parts.

Referring to the figures by characters of reference, E designates a portion of a motor vehicle of any desired type and secured to the front portion of the chassis of this motor vehicle or to any other suitable portion thereof are forwardly extending arms 1, having clips 2 engaging the vehicle, while the outer ends thereof are also provided with clips 3 gripping the lower end portion of tubular side members 4 closed at their upper ends, as shown in Fig. 4. Within each of these tubular side members is mounted a tubular slide 5 in which is housed a coiled spring 6, one end of this spring bearing against the lower end of the slide 5 while its other end bears against the closed upper end of the member 4. A bracket 7 extends from the lower end of each slide 5 and has a pulley 8 journaled in it, this pulley being engaged by a chain, wire, rope, or any other suitable flexible element indicated at 9, and one end of which is secured to the closed upper end of the member 4. The other end of each of the flexible elements 9 is extended upwardly outside of the member 4 and is secured to a rod 10 extending throughout the width of the vehicle. This rod is secured to one end of an apron 11, formed of heavy canvas or the like, and which apron is normally rolled upon a roller 12 journaled within a hood 13. This roller houses a coiled spring 14, one end of which is secured to the roller, while the other end is secured to the housing, and the spring is so arranged that, when the apron is unrolled, said spring is placed under gradually increasing tension. The housing is supported between arms 15 extending from a cross strip 16, the upper end portions of the members being attached to the cross strip by means of brackets 17.

Formed within each of the members 4 near its upper end is an opening 18, and another like opening 19 is formed in the member near its lower end. Each of the slides 5 has an opening 20 adapted, when the slide is pushed upwardly within the member 4, to register with the opening 18 and, when the slide is pushed downwardly within the member 4, to register with the opening 19. A spring pressed catch 21 is mounted on each member 4 with one end portion normally extending into the opening 19 so that, when the opening 20 registers with the opening 19, the catch will swing into said opening 20 and thus lock the parts against relative movement. Levers 22 are mounted on brackets 22' extending from the members 4 and each lever has a latch portion 23 adapted to extend into the openings 18 and 20, thus to hold the slide 5 retracted within the member 4. A spring 24 connects the lever 22 to the member 4 and thus serves to hold the latch portion 23 downwardly projected into the openings 18 and 20. The levers 22 are pivotally engaged by a cross rod 25 which, as shown in Fig. 3, is pivotally attached to the intermediate portion of a lever 26 fulcrumed at one end upon a portion of the housing 13, as shown at 27. A rod 28 connects the other end of the lever 26 to a foot lever 29 located at a point where it can be conveniently actuated by the occupant of the vehicle E.

It is to be understood that under normal conditions the slides 5 are completely housed within the members 4, they being held in such position by the latch portion 23 extending into the opening 20 and the springs 6 being at this time held under compression. The apron 11 is also completely housed within the hood 13 while the connections 9 are held taut by the spring 14 pulling thereon through the apron 11. Whenever it is desired to place the fender in action, the lever 29 is actuated so as to actuate the lever 26 and thus shift the latch members 23 out of the openings 20. Consequently the compressed springs 6 will be released and will project through the slides 5 downwardly until openings 20 are brought into register with openings 19, whereupon the latch member 21 will lock the slides against further movement within the members. During the downward movement of the slides 5 and the pulleys 8, the connection 9 will be drawn longitudinally, thus, unwinding the apron 11 from the roller 12, until, when the pulleys 8 come into contact with the ground, the apron will extend continuously from the housing 13 downwardly to a point close to the ground. In Fig. 1 the position of the lowered apron has been shown by dotted lines, the rod 10 being shown in contact with the pulleys 8. With the fender thus lowered, it will be seen that any large object will be prevented from passing under the wheels of the vehicle. Whenever it is desired to return the fender to its initial or set position, it is merely necessary to disengage the latches 21 from the slides 5, whereupon said slides can be pushed up in the members 4, thus placing springs 6 under compression until the latch portion 23 enters the openings 20 whereupon the parts will be locked. During this upward movement of the slides 5 the apron will be taken up by the spring controlled roller 12.

What is claimed is:—

1. A fender for motor vehicles and the like, including tubular side members, means connecting the same to the front end of the vehicle, tubular slides within said members, springs housed within the members, means for locking the slides in raised position, thereby to hold the springs under compression, a spring controlled roller supported adjacent the upper ends of the side members, an apron normally wound upon the roller, flexible connections between the apron and the upper ends of the side members, said connections movably engaging the lower ends of the slides, and means for releasing the slides simultaneously, said springs constituting means for projecting the slides relative to the side members and for shifting the flexible connections, thereby to unwind the apron from its roll.

2. A fender for motor vehicles and the like including side members, spring pressed slides therein, a spring controlled roller, an apron normally wound on the roller, flexible connections between one end of the apron and the upper end portions of the side members, said connections being movably engaged by the lower portions of the slides, means for holding the slides against movement downwardly relative to the side members, and means for simultaneously releasing the slides.

3. A fender for motor vehicles and the like, including side members, a housing supported adjacent the upper end thereof, a spring controlled roller mounted within the housing, an apron normally wound upon the roller, slides within the side members, springs housed within the slides and side members and constituting means for automatically projecting the slides relative to the side members, means for holding the slides against movement under the action of the springs, means for releasing the slides, and means operated by the slides when released for unrolling the apron and moving it downwardly to a point adjacent the lower ends of the slides.

4. A fender for motor vehicles and the like, including side members, a housing supported adjacent the upper end thereof, a spring controlled roller mounted within the housing, an apron normally wound upon the roller, slides within the side members, springs housed within the slides and side members and constituting means for automatically projecting the slides relative to the side members, means for holding the slides against movement under the action of the springs, means for releasing the slides, and means operated by the slides when released for unrolling the apron and moving it downwardly to a point adjacent the lower ends of the slides, said means including flexible connections between the apron and the upper portions of the side members, and pulleys carried by the slides and engaging said connections.

5. A fender for motor vehicles and the like, including side members, a housing supported adjacent the upper end thereof, a spring controlled roller mounted within the housing, an apron normally wound upon the roller, slides within the side members, springs housed within the slides and side members and constituting means for automatically projecting the slides relative to the side members, means for holding the slides against movement under the action of the springs, means for releasing the slides, and means operated by the slides when released for unrolling the apron and means for automatically locking the slides when reaching the limits of downward movement.

In testimony that I claim the foregoing as my own, I have hereto affixed my signature in the presence of two witnesses.

CHARLES ARTHUR SHELDON.

Witnesses:
W. D. SHELDON,
ROBT. R. SHELDON.

Copies of this patent may be obtained for five cents each, by addressing the "Commissioner of Patents, Washington, D. C."